Figure 3:
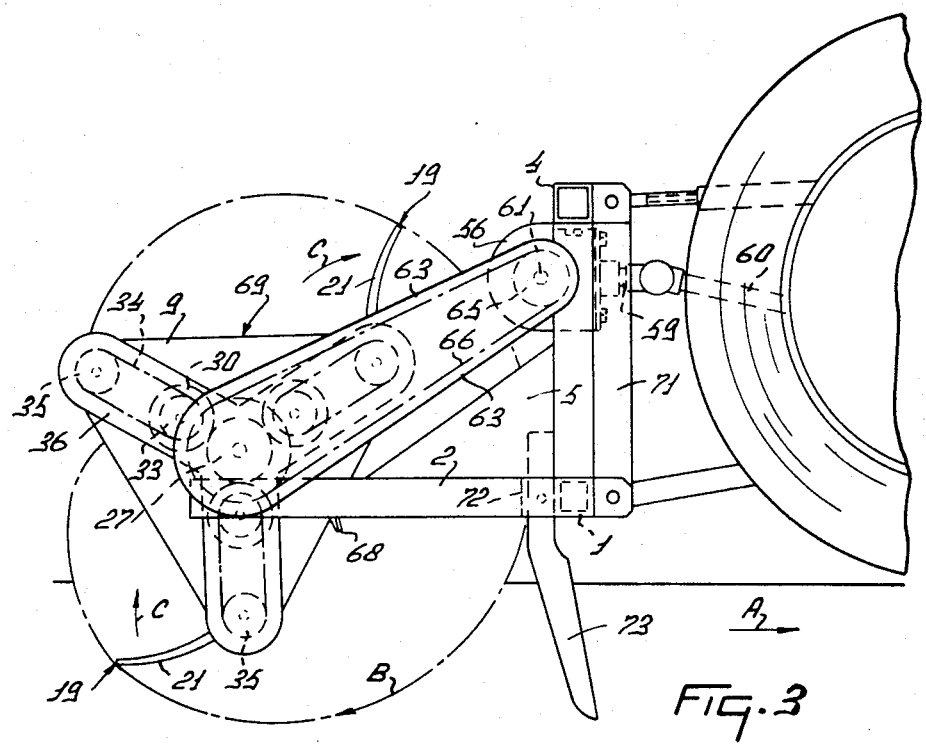

United States Patent [19]
van der Lely

[11] 3,954,143
[45] May 4, 1976

[54] ROTARY PLOUGHS

[76] Inventor: Cornelis van der Lely, 7, Bruschenrain, Zug, Switzerland

[22] Filed: May 20, 1974

[21] Appl. No.: 471,694

[30] Foreign Application Priority Data
May 21, 1973 Netherlands.................... 7307038

[52] U.S. Cl................................... 172/39; 172/46; 172/60; 172/66; 172/97; 172/123
[51] Int. Cl.²................... A01B 33/02; A01B 33/12
[58] Field of Search.................. 172/39, 46, 60, 66, 172/97, 100, 118, 119, 121, 123, 520, 545, 546, 547

[56] References Cited
UNITED STATES PATENTS

| | | | |
|---|---|---|---|
| 345,903 | 7/1886 | Johnson | 172/547 |
| 541,411 | 6/1895 | Allerton et al. | 172/39 |
| 1,552,362 | 9/1925 | Versteeg | 172/121 X |
| 2,412,715 | 12/1946 | Callahan | 172/546 X |
| 2,514,395 | 7/1950 | Iseman | 172/121 X |
| 2,845,015 | 7/1958 | Carawan | 172/545 |
| 3,297,095 | 1/1967 | Lely | 172/60 X |

FOREIGN PATENTS OR APPLICATIONS

| | | | |
|---|---|---|---|
| 6,500,652 | 7/1965 | Netherlands | 172/123 |
| 192,516 | 6/1967 | U.S.S.R. | 172/122 |

*Primary Examiner*—Edgar S. Burr
*Assistant Examiner*—Paul T. Sewell
*Attorney, Agent, or Firm*—Mason, Mason & Albright

[57] ABSTRACT

A rotary plough has a rotor that rotates about a horizontal axis defined by a central support. The rotor comprises three spaced apart groups of soil working tines and each group includes a row of tines mounted on arms that extend radially with respect to the support. Each row of tines is independently connected via a chain transmission to a toothed pinion on the central support so that as the entire rotor turns about the support, each row of tines is also revolved about a horizontal axis. The central support is rotated by a further sprocket and chain transmission connected to a gear box with a P.T.O connection. The central support is surrounded by a second rotatable support on which radial scrapers are mounted. The gear box is connected to rotate the entire rotor as a whole and the three groups of tines in the same direction so that the tines are moved through the soil rearwardly with respect to the normal direction of travel. The scrapers are turned in an opposite direction to intersect the paths of travel of the tines and to scrape some of the earth. The scrapers and tine rows are geared to revolve twice for each full turn of the rotor. The tines are bolted to their holding supports and curved to dig out and lift up slices of soil which are then inverted and deposited on the ground. The digging or angled positions of the tines can be adjusted by a fixing arrangement at one end of the central support.

37 Claims, 7 Drawing Figures

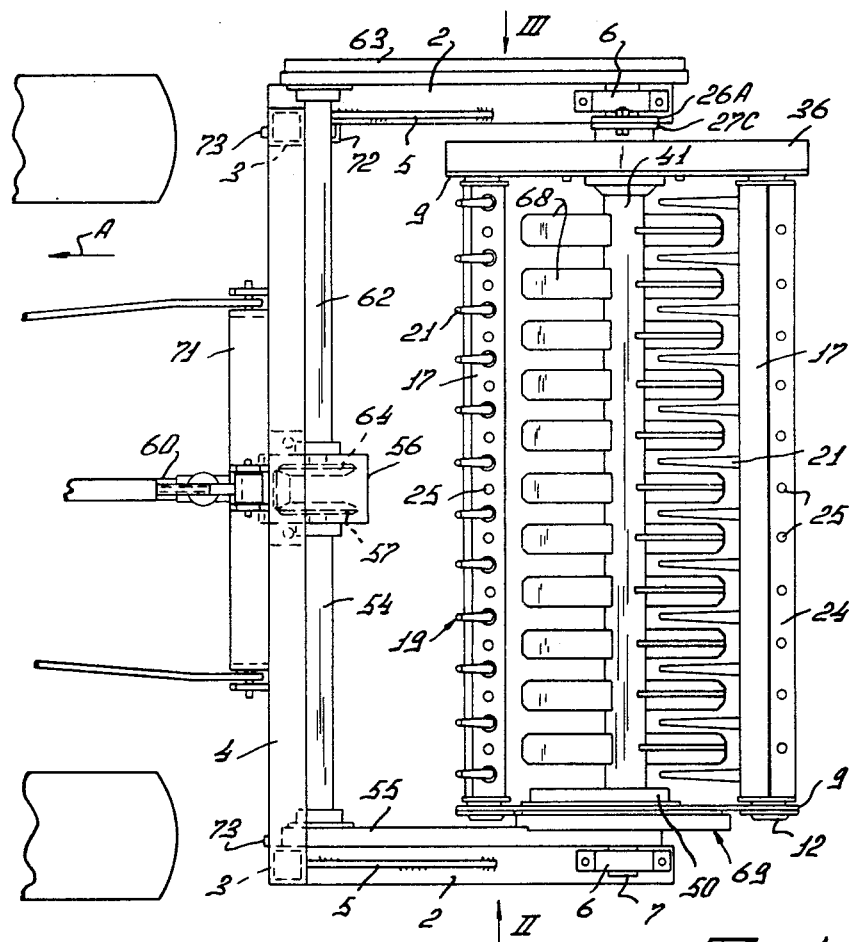
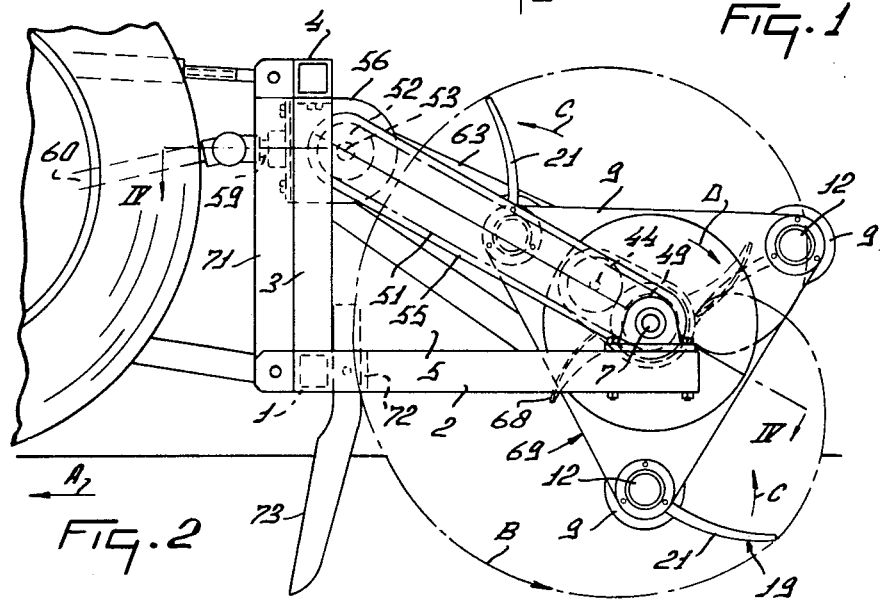
FIG. 1
FIG. 2

ROTARY PLOUGHS

According to the invention, there is provided a rotary plough of the kind set forth, wherein the scraping or shedding member is rotatably arranged within the figure which is generated by movement of the free end or tip of the each working member of said rotor during the operation of the plough.

Figure 5:
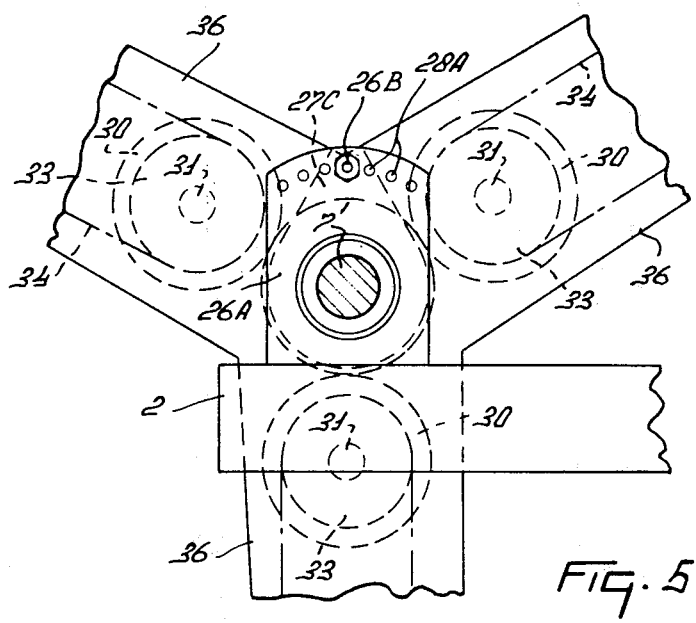
Figure 4:
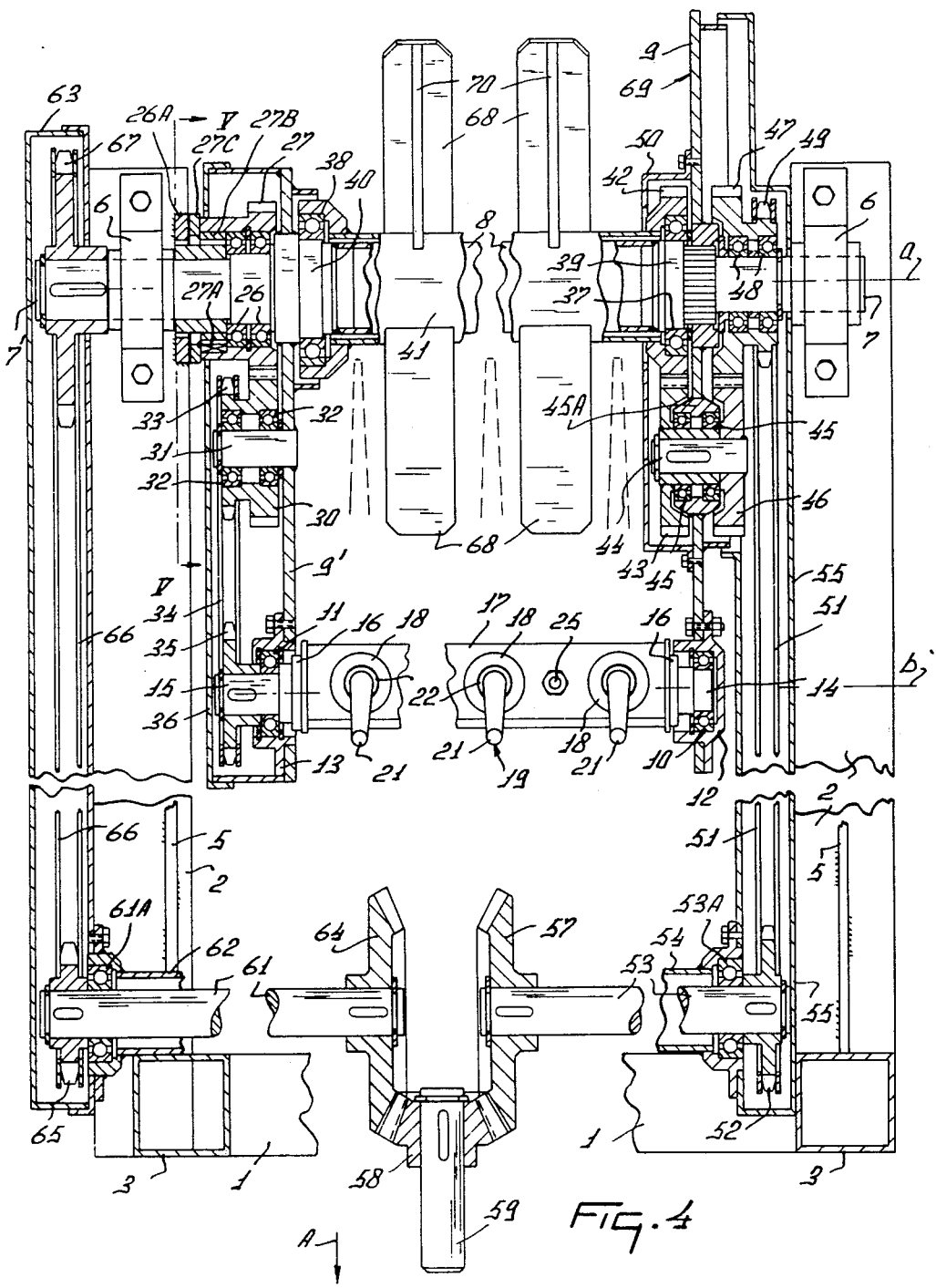
Figure 6:
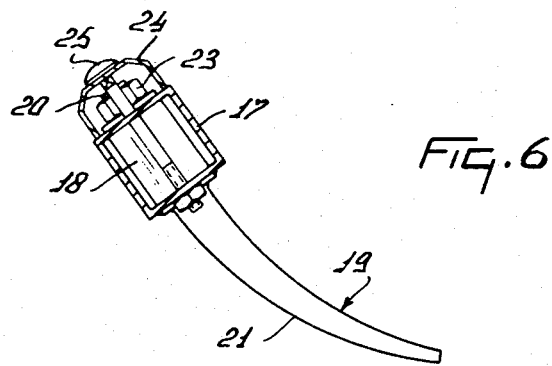
Figure 7:
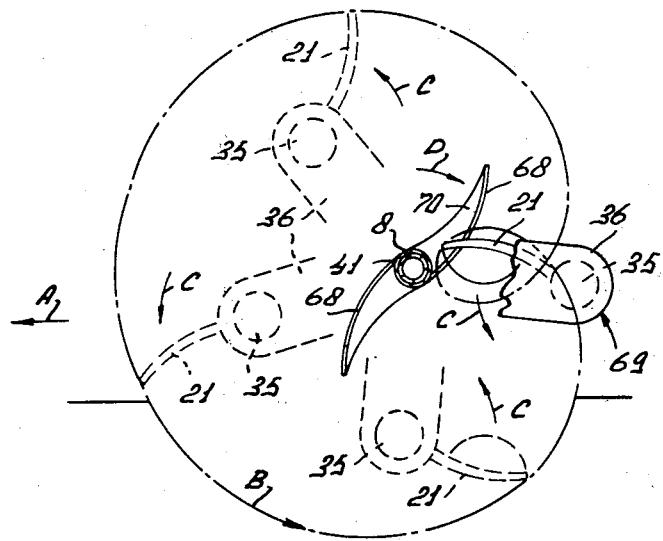

For a better understanding of the invention, and to show how the same may be carried into effect, reference will now be made, by way of example, to the accompanying drawings, in which:

FIG. 1 is a plan view of a rotary plough or cultivator in accordance with the invention coupled to the rear of an agricultural tractor, FIG. 2 is a side elevation as seen in the direction indicated by an arrow II in FIG. 1, FIG. 3 is an opposite side elevation as seen in the direction indicated by an arrow III in FIG. 1, FIG. 4 is a section, to an enlarged scale, taken on the line IV—IV in FIG. 2, FIG. 5 is a section taken on the line V—V in FIG. 4, FIG. 6 is a part-sectional scrap elevation illustrating the construction and mounting of a soil working member or tine of the rotary plough or cultivator in greater detail, and FIG. 7 is a diagrammatic side elevation partially corresponding to FIG. 2 and illustrating successive positions of soil working members or tines of the rotary plough or cultivator during a period of operation thereof.

Referring to the drawings, the rotary plough that is illustrated therein, and which could also be considered as being a soil cultivating implement or cultivator, has a framework or frame which comprises a substantially horizontal beam 1 that extends transverse, and normally substantially perpendicular, to the intended direction of operative travel of the plough which is indicated by an arrow A in FIGS. 1, 2 and 3 of the drawings. The beam 1 is of hollow construction and has a polygonal cross-section which, as illustrated, is preferably square. Further substantially horizontally disposed frame beams 2 that are similar in formation to the frame beam 1 extend rearwardly from the opposite ends of the frame beam 1 with respect to the direction A in substantially parallel relationship with one another and with the direction A. Substantially vertical frame beams 3 project upwardly from locations at, or very close to, the opposite ends of the frame beam 1 and their upper ends are, in turn, rigidly interconnected by a substantially horizontal frame beam 4 that is substantially parallel to the frame beam 1. The beams 3 and 4, like the beam 2, are of the same formation and cross-sectional shape as the beam 1. Strengthening gusset plates 5 of substantially triangular configuration are arranged between the two beams 2 and the two beams 3, said plates 5 being substantially vertically disposed.

Substantially horizontally aligned bearings 6 are mounted on top of the two beams 2 at or near the rearmost ends thereof with respect to the direction A and stub shafts 7 and 7' at the opposite ends of a tubular support 8 of a soil working rotor that is generally indicated by the reference 69 are received in said bearings 6. The tubular support 8 of the rotor 69 extends substantially horizontally parallel to the frame beam 1. It can be seen in FIG. 4 of the drawings that the stub shafts 7 and 7' actually extend into the interiors of the two frame beams 2. The stub shaft 7 carries a plate 9 that is of triangular configuration apart from its rounded corners and the stub shaft 7' carries three arms 9' that are spaced apart from one another at 120° intervals around the longitudinal axis of rotation $a$ of the stub shafts 7 and 7' and the central tubular support 8 of the rotor 69. The outermost ends of the three arms 9' are in register in directions that are parallel to the axis $a$ with the three corners of the plate 9. The outermost ends of the arms 9' that have just been mentioned carry horizontal bearings 11 and the three corners of the plate 9 carry horizontal bearings 10, said bearings 10 and 11 being disposed in corresponding housings 12 and 13 respectively. Substantially horizontal stub shafts 14 and 15 that are connected by plates 16 to further plates at the opposite ends of three tubular tine supports 17 are received in the bearings 10 and 11 respectively. The plates 16 (FIG. 4) are perpendicular to the axes of rotation $b$ of the three tubular tine supports 17.

Each of the three tine supports 17 is provided with a plurality of tine holders 18 that are arranged in a row therealong in regularly spaced apart relationship. Each row conveniently comprises 12 tine holders 18 but it is emphasized that other numbers thereof may equally well be provided. Each holder 18 receives the fastening portion 20 of a corresponding soil working member in the form of a rigid tine 19 (FIG. 6). Each tine 19 also comprises an active or soil working portion 21 that is of uniformly curved configuration and that integrally joins the end of the corresponding fastening portion 20 at the location of a flange or shoulder 22 (FIG. 4) that abuts against one end of the corresponding substantially cylindrical tine holder 18. Each fastening portion 20 has a screw-threaded part at the end thereof remote from the corresponding flange or shoulder 22 and this screw-threaded part receives a corresponding fastening nut 23 that, when tightened, bears against the end of the corresponding holder 18 that is remote from the end thereof in contact with the flange or shoulder 22. Means that are not visible in the drawings but that may take the form of co-operating lugs and notches or recesses or the like are provided to prevent the fastening portions 20 of the tines 19 from turning around their longitudinal axes in the holders 18 once the fastening nuts 23 have been tightened. A screen or cover 24 is fastened to each of the three tine supports 17 by transverse bolts 25 to enclose each of the three rows of nuts 23 and the screw-threaded ends of the corresponding fastening portions 20. The supports 17 and the screens or covers 24 extend substantially the whole of the distance between each corresponding pair of plates 16. However, in order to enable the supports 17 and the parts which they carry to be mounted readily between the plates 16, said supports 17 have their own longitudinal axes somewhat spaced from the axes of rotation $b$ thereof that are defined by the bearings 10 and 11 and the stub shafts 14 and 15.

The uniformly curved active or soil working portions 21 of the tines 19 are of polygonal, and preferably rectangular, cross-sections throughout their lengths and it will be evident from the drawings that said portions 21 taper towards the free ends or tips thereof that are remote from the flanges or shoulders 22. There is, in fact, also a progressive flattening of the portions 21 towards their free ends or tips, said flattening being such that, with the preferred rectangular cross-section, one diagonal between two opposite corners of each portion 21 (as seen in cross-section) has a progressively smaller magnitude than the opposite relatively perpendicular diameter at successive locations moving towards the free end or tip of the tine portion 21 under consideration. It is also preferred, although not illustrated, to provide the portions 21 with concave or hollow grooves in the otherwise flat sides thereof throughout at least two-thirds of the length of each portion 21 commencing from the free end or tip thereof.

A toothed pinion 27 is mounted around the rotary stub shaft 7' with the aid of ball bearings 26, said pinion 27, which has straight- or spur-teeth, being disposed between the arms 9' and the adjacent frame beam 2 and being connected by a key 27A to a bush 27B fastened to a substantially vertical support 27C. The support 27C is located alongside a plate 26A carried by the adjacent frame beam 2, said plate being formed with a curved row of holes 28A whose center of curvature is coincident with the axis $a$. The support 27C is formed with a single hole which can be brought into register with any chosen one of the holes 28A by turning it appropriately around the axis $a$ and a single bolt 26B is provided for entry through said hole, and the chosen hole 28A, to maintain the chosen angular setting.

The teeth of the pinion 27 are in mesh with those of further pinions 30 rotatably mounted on stub shafts 31 by means of ball bearings 32, said stub shafts 31 being carried by the three arms 9'. Each pinion 30 is integral with a corresponding sprocket wheel 33 and transmission chains 34 are passed around said sprocket wheels 33 and further sprocket wheels 35 fastened to the stub shafts 15 at the ends of the three tine supports 17. The driven transmission to each tine support 17 that is comprised by the corresponding parts 27, 30 and 33 to 35 is enclosed within a corresponding casing 36 one side of which, as will be apparent from FIG. 4 of the drawings, is afforded by the corresponding arm 9'. It can also be seen from FIG. 5 of the drawings that the three casings 36 join one another in the region of the stub shaft 7'.

A second tubular support 41 is arranged rotatably and concentrically around the tubular support 8 with the aid of ball bearings 37 and 38 mounted on shoulders 39 and 40 of the stub shafts 7 and 7' respectively. The second tubular support 41 is provided at the end thereof that surrounds the stub shaft 7 with a toothed pinion 42 whose teeth are in mesh with those of a smaller toothed pinion 43. The smaller toothed pinion 43 is mounted on a stub shaft 44 rotatably journalled in ball bearings 45 carried by the plate 9, the longitudinal axis of said stub shaft 44 being coincident with that of one of the three stub shafts 31 whose arrangement has been described above. The bearings 45 in which the stub shaft 44 is rotatably mounted are connected to the plate 9 by a carrying ring 45A which can be seen in FIG. 4 of the drawings and whose arrangement is such that said stub shaft 44 projects from both sides of the plate 9. The toothed pinion 43 is located at one side of the plate 9 at one end of the stub shaft 44 and a symmetrically pinion 46 is located at the other side of the plate 9 and at the opposite end of the stub shaft 44. The teeth of the pinion 46 are in mesh with those of a pinion 47, that is of the same diameter as the pinion 42, the pinion 47 being freely rotatable about the stub shaft 7 with the aid of ball bearings 48. The pinion 47, is however, integral with a sprocket wheel 49 which is linked by a transmission chain 51 to a sprocket wheel 52 carried by a substantially horizontal rotary driving shaft 53 mounted in a ball bearing 53A. It will be noted that the toothed pinions 42 and 43 are protected by a cover 50 that is fastened to the plate 9 and that the pinion 47 and the chain transmission comprising the parts 49, 51 and 52 is surrounded by a casing 55.

The shaft 53 extends axially inside a tubular casing 54 one end of which is fastened to the casing 55 and the other end to a gear box 56 rigidly connected by a bracket to a central region of the bottom of the frame 4. The end of the shaft 53 that is disposed inside the gear box 56 carries a bevel pinion 57 whose teeth are in mesh with those of a smaller bevel pinion 58 carried by a rotary input shaft 59 of the gear box 56 that projects forwardly from the front thereof in substantially the direction A. The input shaft 59 is splined or otherwise keyed to enable it to be placed in driven connection with the power take-off shaft of an operating agricultural tractor or other vehicle by way of an intermediate telescopic transmission shaft 60 of a construction that is known per se having universal joints at its opposite ends. The number of teeth carried by the bevel pinion 57 is twice the number of teeth carried by the bevel pinion 58. A further substantially horizontal drive shaft 61 that is in axial alignment with the shaft 53 has one of its end located inside the gear box 56 and extends inside a tubular casing 62 towards the lateral side of the machine at which the stub shaft 7' is disposed. The end of the shaft 61 remote from the gear box 56 is rotatably received in a ball bearing 61A carried by a protective casing 63 for transmission parts that will be described below.

The end of the shaft 61 that is located inside the gear box 56 carries a bevel pinion 64 that is symmetrically identical to the bevel pinion 57 and whose teeth are also in mesh with those of the smaller bevel pinion 58. It will be evident that the arrangement is such that, during operation, the two shafts 53 and 61 rotate in opposite directions at half the speed of the input shaft 59. The end of the shaft 61 that is located inside the casing 63 is provided, alongside the ball bearing 61A, with a sprocket wheel 65 which is in driving communication with a larger sprocket wheel 67 by way of a transmission chain 66. The sprocket wheeld 67 is secured to the end of the stub shaft 7' that is located laterally just beyond the neighbouring frame beam 2 and the aforementioned casing 63 surrounds said sprocket wheels 65 and 67 and their interconnecting chain 66. It will be noted from FIGS. 1 to 3 of the drawings that, in addition to performing their protective function, the casing 55 and 63 constitute a strengthening interconnection between substantially the rear ends of the frame beams 2 and substantially the upper ends of the frame beams 3.

The second tubular support 41 is provided at regular intervals along its length with a plurality, such as eleven, of opposed pairs of scraper strips 68, said strips 68 extending radially from the support 41 nearly as far as the tine supports 17 and being disposed so that the general planes in which they are movable are located alternately between the general planes of movement of the tines 19 (see FIGS. 1 and 4 of the drawings). Each scraper strip 68 is of uniformly curved configuration when viewed axially along the second tubular support 41 (see FIG. 7), the hollow or concave side thereof being rearmost with respect to the intended direction of rotation D of the support 41. Each scraper strip 68 is strengthened by the provision of a corresponding rib 70 that is located at the concave or hollow curved side thereof that is rearmost with respect to the direction D. As viewed in side elevation (i.e. axially of the second tubular support 41/FIG. 7) each opposed pair of scraper strips 68 presents a very shallow S-shaped configuration. The fronts of the frame beams 1 and 4 are provived, in a central region thereof, with a coupling member or trestle 71 that may be of a generally triangular configuration and that is constructed and arranged for pivotal connection to the free ends of the lifting links of a three-point lifting device or hitch mounted at the rear of an agricultural tractor or other operating vehicle in the manner that is generally known per se and that is illustrated in outline in FIGS. 1 to 3 of the drawings. Holders 72 are mounted in the two right-angled junctions between the frame beam 1 and the two frame beams 2 and receive upwardly and downwardly adjustable soil-slicing coulters 73 that are arranged to cut into the soil at substantially the opposite lateral sides of the working path of the rotor 69. The holders 72 comprise set bolts or the like to retain the coulters 73 in their chosen height settings.

In the use of the rotary plough or cultivator that has been described, its coupling member or trestle 71 is pivotally connected to the three-point lifting device or hitch of an operating tractor or other vehicle and the rotary input shaft 59 of the gear box is placed in driven connection with the power take-off shaft of the same tractor or other operating vehicle by way of the intermediate telescopic transmission shaft 60. Upon moving in the direction A over soil that is to be ploughed or cultivated, the rotor 69 which comprises the three groups of soil working tines 19 is driven so that it will rotate in the direction B shown in FIGS. 2, 3 and 7 of the drawings which direction is such that the parts thereof which are in contact with the soil at any time are moving rearwardly therethrough with respect to the direction A. Each tine support 17 and its tines 19 are simultaneously rotated around the corresponding axis $b$ in the direction C which is also shown in FIGS. 2, 3 and 7 of the drawings and which direction is the same as the direction B. The rotation of the supports 17 in the rotor 69 is brought about by the pinion 27, the pinions 30 and the chain transmissions comprising the parts 33 to 35, the arrangement being such that, during one complete revolution of the rotor 69 through 360° about the axis $a$, each support 17 and its tines 19 will have revolved twice through a total of 720° around the corresponding axis $b$.

FIG. 7 of the drawings diagrammatically illustrates the operation of the rotary plough and it will be seen in that Figure that each of the three rows of tines 19 penetrates successively into the soil throughout a working width of preferably, but not essentially, substantially 150 centimeters. The active or soil working portions 21 of the tines 19 loosen successive slices of earth from the soil and lift those slices upwardly out of the soil. The position of the supports 17 and their tines 19 is such that each successive row thereof occupies the same position relative to the ground surface at the time of penetration into that surface so that soil displacement takes place in a regular manner. As can be seen at the foot of FIG. 7 of the drawings, a slice of earth that is loosened from the surrounding soil and subsequently supportingly displaced by one of the rows of tines 19 is inverted shortly after that row of tines has passed upwardly out of the surface so that the slice of earth will fall back under the action of gravity into the furrow excavated by the tines 19, said slice falling back to substantially the location lengthwise of the direction of travel from which it was originally cut, only in a substantially inverted condition. It is advantageous that the angle of attack of the tines 19 relative to the ground surface should be changed to match the nature and condition of the soil that is to be dealt with and/or the particular work that is to be undertaken and this is effected by temporarily removing the bolt 26B and turning the support 27C about the axis $a$ until the hole in said support comes into register with a fresh hole 28A. The bolt 26B is then replaced to maintain the new setting. It will be apparent that such adjustment determines a new angularly fixed setting of the pinion 27 and causes angular displacement of the tine supports 17 to new positions through the intermediary of the parts 30, 33, 34 and 35.

The position of the scraper strips 68 is such that, at the instant at which each row of tines 19 reaches a position at which gravity will tend to cause a slice of earth previously supported thereby to fall back into the excavated furrow (see FIG. 7), one row of the scraper strips 68 passes through that row of tines 19 thus positively pushing the slice of earth downwardly out of contact with the active or soil working portions 21 of the tines so that sticky soil will not adhere too long to those portions. The scraper strips 68 will push the successive slices of soil downwardly in a more or less vigorous manner in dependence upon the angular settings of the tines 19 around the axes $b$ that have been chosen by previously fixing the support 27C relative to the plate 26A. The direction of rotation D of the scraper strips 68 is opposite to the combined directions of rotation B and C of the tines 19 and the curved shapes of the tine portions 21 and the scraper strips 68 ensure a very effective loosening of the successive slices of soil from said tine portions 21 so that the rotary plough operates in a very regular manner even in soils that tend to adhere strongly to tines and the like. It will be remembered that the axis of rotation in the direction D of the scraper strips 68 is the same axis $a$ as that around which the whole rotor 69 revolves. The speed of rotation of the scraper strips 68 in the direction D is the same as that of the tine supports 17 and tines 19 in the direction C around the axes $b$ and is thus twice the speed of rotation of the whole rotor around the axis $a$ in the direction B. The last mentioned speed of rotation is one-quarter of the speed of rotation of the input shaft 59 of the gear box 56.

The rotor 69 of the rotary plough or cultivator that has been described has three rows of soil working tines 19 arranged in regularly spaced apart relationship at its periphery, the rows of tines 19 being rotatable about the axis $b$ at the same time as the whole rotor 69 revolves around the axis $a$. The rows of tines 19 cut successive slices of earth from soil that is being worked and the centrally arranged rotary scraper strips 68 ensure that said slices are positively shed from the tines 19 to fall back into the excavated furrow in a substantially inverted condition. The rotary plough which has been described is particularly suitable for deep ploughing operations and has a compact structure principally by virtue of the central arrangement of the scraper strips 68 which scraper strips afford a scraping or shedding member that is arranged substantially wholly within the figure generated by the free ends or tips of the active or soil working portions 21 of the tines 19 during the operation of the plough (see FIG. 7 of the drawings). As previously mentioned, the furrow that is cut by the plough during operation has accurately defined sides which are formed by the passage of the coulters 73 through the soil.

Although various features of the rotary plough or cultivator that has been described and/or illustrated in the accompanying drawings will be set forth in the following claims as inventive features, it emphasised that the invention is not necessarily limited to those features and that it includes within its scope each of the parts of the rotary plough or cultivator that has been described and/or illustrated in the accompanying drawings both individually and in various combinations.

I claim:

1. A rotary plough comprising a frame and a rotor mounted on horizontal support means on said frame, said rotor having a substantially horizontal axis of rotation, means rotatably mounting soil working means on said rotor so as to be turnable relative to the remainder of said rotor, and movable in a rotary path through the ground to penetrate, loosen and lift successive slices of soil upwardly out of the ground, means rotatably connecting at least one scraping member on said support means within said path and said scraping member being positioned to describe a path that intersects said rotary path of said soil working means during operation and remove soil from said soil working means, driving means on said plow in driving engagement with said rotor, said scraping member and said soil working means.

2. A plough as claimed in claim 1, wherein said drive means is connected to rotate said scraping member, in a direction opposite to the direction of rotation of said rotor and said soil working means.

3. A plough as claimed in claim 2, wherein said scraping member is rotatable about an axis that is substantially parallel to said horizontal axis of rotation of the rotor.

4. A plough as claimed in claim 3, wherein said scraping member is rotatable about an axis which coincides with said horizontal axis of rotation.

5. A plough as claimed in claim 4, wherein said rotor comprises a plurality of soil working members and there are a plurality of scrapers on said scraping member.

6. A plough as claimed in claim 5, wherein said scrapers are arranged in at least one row.

7. A plough as claimed in claim 6, wherein said row extends across substantially the entire width of said rotor.

8. A plough as claimed in claim 7, wherein said scrapers are positioned in two rows on a tubular support, said two rows being located diametrically opposite one another with respect to said support.

9. A plough as claimed in claim 5, wherein each scraper is bent from a fastening point on said support means in a direction opposite to the normal direction of rotation of said soil working means.

10. A plough as claimed in claim 9, wherein each scraper is a strip having flat surfaces which extend substantially parallel to the axis of rotation of said scraping member.

11. A plough as claimed in claim 5, wherein said scrapers are secured to a tubular support and said tubular support has a longitudinal axis that coincides with an axis around which the entire scraping member is rotatable.

12. A plough as claimed in claim 2, wherein a drive transmission of said drive means is connected to said scraping member and is located at an opposite lateral side of the plough from a further drive transmission for said rotor.

13. A plough as claimed in claim 1, wherein said rotor comprises at least one group of soil working members that is rotatable about a further horizontal axis of rotation spaced from the axis of rotation of said rotor.

14. A plough as claimed in claim 13, wherein said rotor comprises three groups of soil working members that are each rotatable about corresponding further horizontal axes of rotation that are all spaced from the axis of rotation of said rotor, said groups being spaced apart from one another around the axis of rotation of said rotor at substantially 120° intervals.

15. A plough as claimed in claim 14, wherein each group of soil working members is connected to a respective drive transmission that extends between the corresponding further axis of rotation and the axis of rotation of said rotor.

16. A plough as claimed in claim 15, wherein each respective drive transmission comprises at least one freely rotatable pinion in driving engagement with a drive pinion that is concentric with the axis of rotation of said rotor.

17. A plough as claimed in claim 16, wherein each respective drive transmission comprises a chain transmission extending between said freely rotatable pinion and said drive pinion.

18. A plough as claimed in claim 17, wherein the chain transmission to each group of soil working members has a transmission ratio 2 : 1, and each group rotates twice around its corresponding further axis of rotation during a single complete revolution of said rotor.

19. A plough as claimed in claim 18, wherein said scraping member includes strips that co-operate scrapingly with said soil working members when the latter are disposed generally above a slice of earth previously cut from the ground.

20. A plough as claimed in claim 13, wherein each group of soil working members includes a holding support for that group and the latter is rotatable about said further axis of rotation, said further axis extending parallel to the longitudinal axis of said holding support.

21. A plough as claimed in claim 20, wherein a chain transmission comprising a sprocket wheel at one end of said holding support is connected to said drive means and each group of soil working members is rotatably driven by said drive means.

22. A plough as claimed in claim 20, wherein each holding support is carried by an arm connected to one end of said support means.

23. A plough as claimed in claim 22, wherein a plate member is connected to an end of said support means and each holding support is journalled in said plate member.

24. A plough as claimed in claim 23, wherein the arm for at least one holding support also carries part of said driving means which part drivingly engages said scraping member.

25. A plough as claimed in claim 24, wherein said part comprises a sprocket wheel and toothed pinion combination that is rotatable about the axis of rotation of said rotor, said combination being connected by a chain to a drive shaft and said combination also being connected by gear means on said rotor to a further pinion on a shaft of said support means that bears said scraping member.

26. A plough as claimed in claim 20, wherein each holding support includes tine holders located at equal intervals along the length of that support and soil working tines are mounted in said holders.

27. A plough as claimed in claim 26, wherein each tine comprises an active portion that is curved away from a fastening portion in the same general direction as the normal direction of rotation of the group of which it forms a part.

28. A plough as claimed in claim 27, wherein each active portion is of curved configuration for at least two thirds of its length, and tapers towards a tip.

29. A plough as claimed in claim 27, wherein the fastening portion of each tine is fixed in a respective holder by a nut mounted on a screw-threaded part of said fastening portion, and a cover encloses the nuts.

30. A plough as claimed in claim 1, wherein said driving means comprises an imput drive shaft, said imput shaft being connected to two chain transmissions through a toothed pinion transmission, one of said chain transmissions being engaged to drive said rotor, the second chain transmission being engaged to drive said scraper member.

31. A plough as claimed in claim 30, wherein the toothed pinion transmission has a transmission ratio of 1 : 2.

32. A plough as claimed in claim 30, wherein each chain transmission has a transmission ratio of 1 : 2.

33. A plough as claimed in claim 1, wherein said soil working means comprises at least one group of soil working members that is rotatable about a further horizontal axis spaced from said support means, and said soil working members are connected to said drive means for movement through the ground in a direction opposite to the normal direction of travel of said plough.

34. A plough as claimed in claim 33, wherein the direction of rotation of said group of soil working members is the same as the normal direction of rotation as said rotor.

35. A rotary plough comprising a frame and a rotor mounted with horizontal support means on said frame, said rotor being rotable about said support means and having means rotatably mounting groups of soil working members on said rotor and said groups being rotatable about corresponding horizontal axes that are held by arm means that extend radially from said support means, means rotatably attaching a scraping member on said support means and driving means connected to said rotor, each of said groups of coil working members and said scraping member, said driving means including an imput gear that engages a drive shaft and a driving shaft, said drive shaft being connected to rotate said rotor and said groups of soil working members in one direction, said driving shaft being connected to rotate said scraping member in a second and opposite direction, said scraping member including at least one scraper that extends radially from said support means and said scraper being movable through an intersecting path with respect to said soil working members.

36. A plough as claimed in claim 35, wherein the revolutions of said rotor, said scraping member and said groups of soil working members are synchronized by said driving means, whereby successive slices of soil are loosened and lifted upwardly by said groups and said scrapers are rotated to push the soil downwardly from said groups as the latter rotate and deposit the slices in inverted condition.

37. A plough as claimed in claim 36, wherein setting means is connected to said horizontal support means and said setting means is turnable and fixable in a plurality of positions to alter the relative positions of said soil working members with respect to said scraper member.

* * * * *